Oct. 15, 1957   C. F. KAUNITZ   2,810,062
WELDING APPARATUS
Filed Jan. 20, 1956
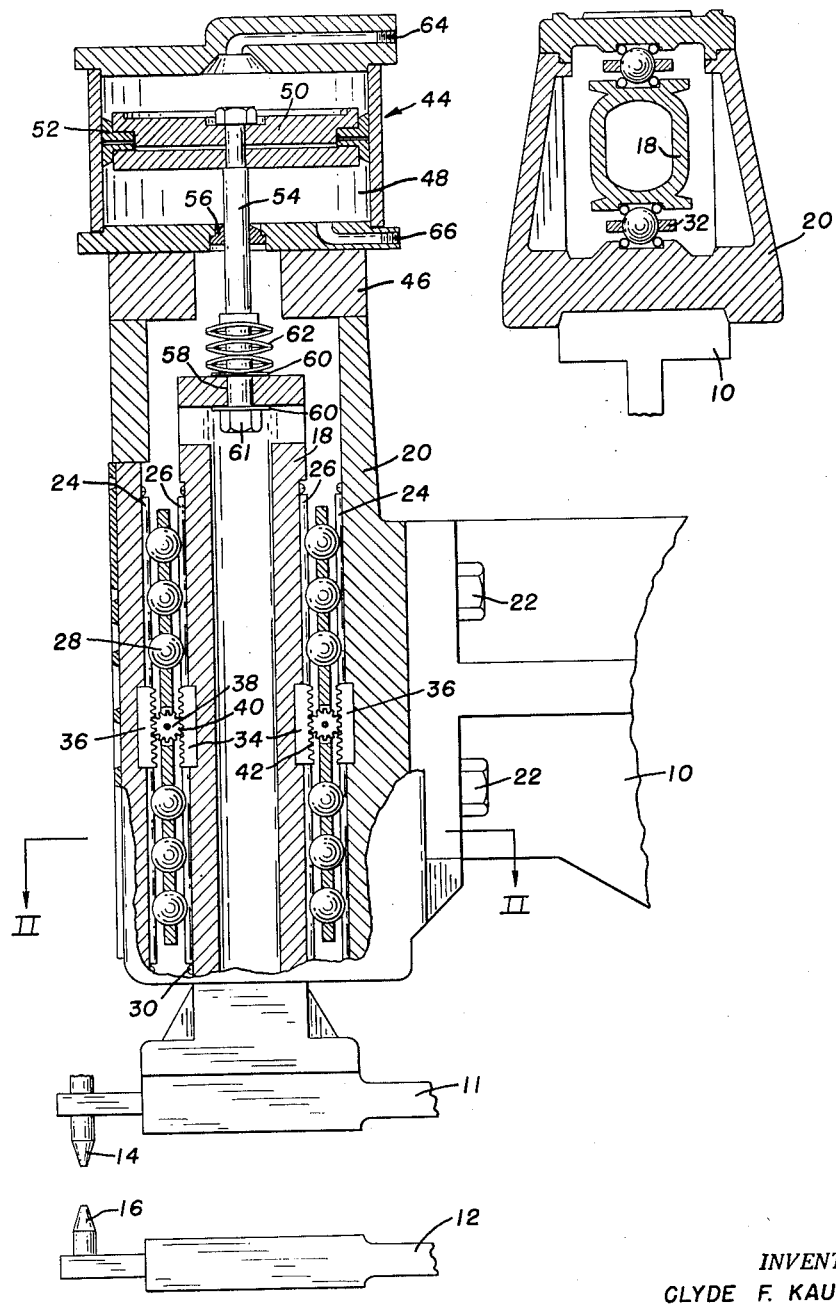
INVENTOR.
CLYDE F. KAUNITZ
BY
Winston E. Miller
ATTORNEY

United States Patent Office 2,810,062
Patented Oct. 15, 1957

2,810,062

WELDING APPARATUS

Clyde F. Kaunitz, Bay City, Mich.

Application January 20, 1956, Serial No. 560,383

2 Claims. (Cl. 219—89)

This invention relates to welding apparatus, and more particularly to improved resistance welding apparatus wherein the work is engaged between welding electrodes during the weld-forming operation, and the principal object of my invention is to provide new and improved apparatus of the class described.

In the art of resistance welding it is common knowledge that one of the major factors causing imperfect welds is the failure of the apparatus to maintain a constant pressure on the weld as the heat produced by the welding current softens the work metal. Since this softening of the work occurs rather abruptly, the movable electrode should instantly follow up the softened metal in order to maintain the welding pressure and produce a sound weld; but, as is often the case, the movable electrode lags behind the softening of the metal and causes a momentary reduction in welding pressure which results in an imperfect weld.

Apparatus of the prior art has either failed to overcome this momentary reduction of welding pressure or has attempted to solve the problem by complicated and expensive means which are often unreliable and require frequent attention. In contrast, my invention provides simple and inexpensive apparatus which produces the desired result in an extremely reliable manner.

The success of my invention may be attributed to the fact that I have accomplished that which the prior art has failed to accomplish, namely, the provision of inexpensive welding apparatus wherein friction and inertia of the parts carrying the movable electrode are reduced to a negligible value. These and other advantages of my invention will become apparent from a study of the description which follows:

In the drawing forming a part of this application, there is shown, for purposes of illustration, an embodiment which my invention may assume, and in this drawing:

Figure 1 is a longitudinal, partially sectional view of the welding apparatus embodying my invention; and Figure 2 is a cross-sectional view of the welding apparatus taken on line II—II of Figure 1.

Referring to the drawing, it will be seen that the invention is therein shown applied to conventional spot-welding apparatus having a ram support 10, an upper arm 11 and a lower arm 12. The ram support 10 is secured to and extends outwardly of a housing or pedestal (not shown), and such housing may contain the usual transformer, controls and other associated parts well known in the art. As illustrated, the upper and lower arms 11 and 12 provide support for respective upper and lower welding electrodes 14 and 16.

As in conventional apparatus, the lower electrode 16 is carried by the lower arm 12 and the upper electrode 14 is carried by a slide that is attached to the arm 11 and which permits the upper electrode to be moved toward the lower electrode so as to engage the work therebetween.

In the embodiment illustrated, I provide a slide 18 which combines lightness with strength. This slide 18 is reciprocable within a slide housing 20, and the housing 20 may be secured to the ram support 10 by any convenient means, bolts 22 presently being used to effect such securement.

In order to reduce to a minimum the friction between the reciprocable slide 18 and its housing 20, I have provided two pairs of hardened rods 24 and 26 on opposing sides of the housing 20 and the slide 18, each pair of rods 24 and 26 providing raceways or tracks wherein are positioned ball bearings 28 which are used to provide a relatively long bearing support. The pairs of rods 24 and 26 are retained to the housing 20 and the slide 18 respectively by means of the screws 30, and thereby maintain appropriate tracks or raceways for rolling engagement of the ball bearings 28 therein. Pairs of retainers 32 are disposed on the sides of the ball bearings 28 and provide means for supporting and for lubricating the ball bearings.

In order to further support the slide 18 in the housing 20 I have provided a pair of rack bars 34 on the slide 18 and opposed thereto on the housing 20 I have attached like rack bars 36. The gears 38 are situated between the rack bars 34 and 36 and the teeth 40 of said gears 38 mesh with the teeth 42 of said rack bars on sliding movement of the slide 18 in the housing 24.

The means employed to effect movement of the slide 18 and its attached electrode 14 in a direction to apply welding pressure is shown to comprise a pressure mechanism 44. This pressure mechanism 44 is secured to a plate 46, and the plate 46 is in turn secured to the top of the housing 20. The pressure mechanism 44 comprises a cylinder 48, a piston 50 and a seal 52 that is attached to the piston 50 and moves with the piston in the cylinder 48.

A piston rod 54 is secured to the piston 50 and extends downwardly therefrom and through the seal 56 outwardly of the cylinder 48. The free end of the piston rod 54 fits through an opening 58 in the upper end of the slide 18 and the washers 60, and is fastened to the slide 18 by means of the lock-nut 61. A suitable follow-up spring 62 is attached to the piston rod 54 and acts as a spring follow-up for rapid upset of the slide 18. The parts 64 and 66 are provided for connection of the pressure mechanism 44 to a pressure source.

*Operation*

The operation of my improved welding apparatus is as follows: The work to be welded is first placed between the upper and lower electrodes. Then the usual foot operated valve, or the like, may be shifted so as to admit fluid or air under pressure to the top of the piston 50. The piston 50 will then move downwardly until the work has been firmly clamped between the two electrodes. Welding current may then be caused to flow between the electrodes by means well-known in the art. Upon completion of the weld, the fluid or air pressure above the piston may be vented to exhaust and fluid or air under pressure may be admitted to the underside of the piston 50 so as to raise the piston 50 and the attached parts.

During the above recited welding cycle, and as the work metal softens under the heat produced by the welding current, the pressure in the cylinder 48 will cause the slide 18 to closely follow-up the weld by advancing the upper electrode 14 so as to maintain proper welding pressure upon the work and produce a sound weld. This follow-up takes place immediately since, as before described, friction opposing movement of the slide has been virtually eliminated by the provision of ball bearings, and the gear-rack bars combination; and inertia of the movable parts has been minimized by the elimination of the conventional heavy construction and by use of the lightweight yet strong slide 18.

The preferred embodiment of the invention has been disclosed as required by the patent laws. It will be understood, however, that the invention is capable of various modifications and that the detailed description of the preferred embodiment is therefore not to be construed as a limitation of the scope of the invention, which is to be determined from the appended claims.

I claim:

1. A welding apparatus for an electric welding machine having rapid weld follow-up characteristics, comprising an elongated housing having a longitudinal opening therethrough, a slide member enclosed within said opening and supporting a welding electrode at one end of said housing, said slide member having a transverse size less than that of said opening, a group of rods lying longitudinally between said slide and said housing in said opening, some of said rods being affixed to said slide and others of said rods being affixed to said housing and lying in opposing relationship to each other, a plurality of ball bearings spaced longitudinally of said slide member and between said rods and having rolling contact with said rods, a pair of retainers lying longitudinally within said opening and contacting said ball bearings on opposing sides thereof, a first pair of rack bars having teeth thereon each centrally affixed to opposing sides of said housing in said opening, and a like pair of rack bars each affixed to opposing sides of said slide and each of said first pair of rack bars, a pair of tooth gears fastened inside said housing each of which movably engage the teeth of said rack bars on reciprocation of said slide member in said housing, said ball bearings and gear-rack bars combination maintaining said slide member in axial position relative to said housing and providing for anti-friction axial reciprocation of said slide member within said housing opening, a pressure mechanism mounted on the end of said housing opposed to said electrode comprising a cylinder having a piston mounted therein, a piston rod affixed at one end to said piston and at its other end to said slide member, a follow-up spring mounted on said piston rod for cushioning the movement of said slide in said housing, means for introducing pressure into and venting from said cylinder whereby pressure entering said cylinder will move said piston and slide member in a direction toward said work to be welded, whereby the end of the movable electrode will follow up the receding work surface as such surface softens under the heat generated by the welding current.

2. A welding apparatus for an electric welding machine having rapid weld follow-up characteristics, comprising an elongated housing having a longitudinal opening therethrough, a slide member enclosed within said opening and supporting a welding electrode at one end of said housing, said slide member having a transverse size less than that of said opening, a group of rods lying longitudinally between said slide and said housing in said opening, some of said rods being affixed to said slide and others of said rods being affixed to said housing and lying in opposing relationship to each other, a plurality of ball bearings spaced longitudinally of said slide member and between said rods and having rolling contact with said rods, a pair of retainers lying longitudinally within said opening and contacting said ball bearings on opposing sides thereof, a first pair of rack bars having teeth thereon each centrally affixed to opposing sides of said housing in said opening, and a like pair of rack bars each affixed to opposing sides of said slide and each of said first pair of rack bars, a pair of tooth gears fastened inside said housing each of which movably engage the teeth of said rack bars on reciprocation of said slide member in said housing, said ball bearings and gear-rack bars combination maintaining said slide member in axial position relative to said housing and providing for antifriction axial reciprocation of said slide member within said housing opening.

References Cited in the file of this patent
UNITED STATES PATENTS

| 962,502 | Elmborg | June 28, 1910 |
| 1,005,055 | Miller | Oct. 3, 1911 |
| 1,813,321 | Scherer | July 7, 1931 |
| 2,028,718 | Heine | Jan. 21, 1936 |
| 2,117,161 | Gallasch et al. | May 10, 1938 |
| 2,672,378 | McVey | Mar. 16, 1954 |
| 2,689,295 | Goldner | Sept. 14, 1954 |